(12) United States Patent
Davies et al.

(10) Patent No.: US 10,919,443 B2
(45) Date of Patent: Feb. 16, 2021

(54) VEHICLE INTEGRATED STORAGE POWER MANAGEMENT SYSTEM

(71) Applicant: PRIDE MOBILITY PRODUCTS CORPORATION, Exeter, PA (US)

(72) Inventors: Robert Davies, Mountaintop, PA (US); Nicholas E. Kuzma, Dallas, PA (US); Robert McCollough, West Wyoming, PA (US)

(73) Assignee: PRIDE MOBILITY PRODUCTS CORPORATION, Exeter, PA (US)

(*) Notice: Subject to any disclaimer, the term of this patent is extended or adjusted under 35 U.S.C. 154(b) by 0 days.

(21) Appl. No.: 16/488,522

(22) PCT Filed: Feb. 22, 2018

(86) PCT No.: PCT/US2018/019216
§ 371 (c)(1),
(2) Date: Aug. 23, 2019

(87) PCT Pub. No.: WO2018/156757
PCT Pub. Date: Aug. 30, 2018

(65) Prior Publication Data
US 2020/0039424 A1 Feb. 6, 2020

Related U.S. Application Data

(60) Provisional application No. 62/463,623, filed on Feb. 25, 2017.

(51) Int. Cl.
*B60Q 1/44* (2006.01)
*A61G 5/04* (2013.01)
(Continued)

(52) U.S. Cl.
CPC .............. *B60Q 1/44* (2013.01); *A61G 5/045* (2013.01); *A61G 5/047* (2013.01); *B60Q 1/0094* (2013.01); *B60T 7/085* (2013.01)

(58) Field of Classification Search
CPC ........ B60Q 1/44; B60Q 1/0094; A61G 5/045; A61G 5/047; B60T 7/085
(Continued)

(56) References Cited

U.S. PATENT DOCUMENTS 5,020,624 A * 6/1991 Nesterick ............... B62K 5/025
180/208
7,782,185 B1 8/2010 Burns
(Continued)

FOREIGN PATENT DOCUMENTS

EP 2045127 A1 4/2009
EP 2390135 A1 11/2011
(Continued)

OTHER PUBLICATIONS

International Search Report for International Application No. PCT/US2018/019216 dated May 8, 2018, 2 pages.
(Continued)

*Primary Examiner* — John A Tweel, Jr.
(74) *Attorney, Agent, or Firm* — Morgan, Lewis & Bockius LLP (57) ABSTRACT

A vehicle includes a front modular assembly having at least one front wheel, a steering assembly, a throttle, and a power source. The vehicle may include a rear modular assembly removably couplable to the front modular assembly and having at least one rear wheel, a brake selectively coupled to the at least one rear wheel, and at least one rear light configured to emit light while receiving a power signal, the at least one rear light and the brake being in electrical communication with the power source via a shared electrical connection while the rear modular assembly is coupled to the front modular assembly. The vehicle may include a controller in electrical communication with the power source, the controller being configured to selectively provide (Continued)

the power signal to the brake and the rear light via the shared electrical connection.

13 Claims, 8 Drawing Sheets

(51) Int. Cl.
*B60Q 1/00* (2006.01)
*B60T 7/08* (2006.01)

(58) Field of Classification Search
USPC .......................................................... 340/479
See application file for complete search history.

(56) References Cited

U.S. PATENT DOCUMENTS

| | | | |
|---|---|---|---|
| 8,397,844 B2 * | 3/2013 | Vasant | B60K 1/04 180/65.1 |
| 8,706,331 B2 * | 4/2014 | Meyers | B60K 7/0007 180/220 |
| 8,950,564 B1 | 2/2015 | Penner | |
| 9,090,207 B2 * | 7/2015 | Meyers | B60Q 1/38 |
| 9,187,031 B1 | 11/2015 | Ovenshire et al. | |
| 9,238,432 B1 | 1/2016 | Jameson | |
| 10,046,695 B2 * | 8/2018 | Smith | B60Q 1/0076 |
| 2004/0031630 A1 | 2/2004 | Roach | |
| 2013/0264941 A1 | 10/2013 | Osherov | |

FOREIGN PATENT DOCUMENTS

| | | |
|---|---|---|
| EP | 3027462 A1 | 8/2016 |
| WO | 2015035272 A1 | 3/2015 |

OTHER PUBLICATIONS

Written Opinion for International Application No. PCT/US2018/019216 dated May 8, 2018, 8 pages.
Examination Report No. 1 for Australian Patent Application No. 2018224105 dated Nov. 11, 2019, 5 pages.
Chinese Office Action for Chinese Patent Application No. 201880026953.1; dated Mar. 30, 2020.
Extended European Search Report for corresponding European Patent No. 3585345 dated Nov. 5, 2020, 7 pages.

* cited by examiner

VEHICLE INTEGRATED STORAGE POWER MANAGEMENT SYSTEM

CROSS-REFERENCE TO RELATED APPLICATIONS

This application is a 371 of International Application No. PCT/US2018/019216 filed on Feb. 22, 2018 entitled "Vehicle Integrated Storage Power Management System", which claims the benefit of U.S. Provisional Patent Application No. 62/463,623, filed Feb. 25, 2017, entitled "Vehicle Integrated Storage Power Management System", each of which is incorporated by reference herein in its entirety.

BACKGROUND

The present invention generally relates to vehicle power systems and, more particularly, to a vehicle power system for powering components in a rear modular assembly.

SUMMARY

In one embodiment, a vehicle includes a front modular assembly having at least one front wheel, a steering assembly to steer the at least one front wheel, a throttle to drive the vehicle, and a power source configured to generate a power signal. The vehicle may include a rear modular assembly removably couplable to the front modular assembly having at least one rear wheel, a brake selectively coupled to the at least one rear wheel, and at least one rear light configured to emit light while receiving the power signal. The at least one rear light and the brake may be in electrical communication with the power source via a shared electrical connection while the rear modular assembly is coupled to the front modular assembly. The vehicle may include a controller in electrical communication with the power source. The controller may be configured to selectively provide the power signal to the brake and the rear light via the shared electrical connection.

In one embodiment, the controller is configured to cause the brake and the at least one rear light to receive the power signal while the throttle is activated, which causes the brake to disengage from the at least one rear wheel and causes the at least one rear light to emit light. In one embodiment, the controller is configured to prevent the brake and the at least one rear light from receiving the power signal while the throttle is released, which causes the brake to engage the at least one rear wheel and causes the at least one rear light to refrain from emitting light using the power signal.

In one embodiment, the brake includes a solenoid that causes the brake to restrict motion of the at least one rear wheel in the engage state while not receiving the power signal and causes the brake to disengage from the at least one rear wheel while receiving the power signal.

In one embodiment, the controller includes a storage device that stores residual energy from the power signal while the throttle is activated. In one embodiment, the controller causes the at least one rear light to receive the residual energy from the power signal for a residual energy light emission time period after the throttle is released.

In one embodiment, the storage device includes one or more capacitors.

In one embodiment, the residual energy light emission time period is from 5 to 30 seconds.

In one embodiment, the at least one rear light draws a current from the power signal. In one embodiment, the current from the power signal is less than an electrical current power threshold.

In one embodiment, the at least one rear light includes a plurality of light elements. In one embodiment, each of the plurality of light elements emits light in a predetermined sequential order.

In one embodiment, the at least one light includes a first area and a second area. In one embodiment, a first portion of the plurality of light elements are arranged in the first area and a second portion of the plurality of light elements are arranged in the second area. In one embodiment, the controller is configured to cause the first portion of the plurality of light elements in the first area to emit light before causing the second of the plurality of light elements in the second area to emit light in the predetermined sequential order.

In one embodiment, the first area is a top area of the at least one rear light and the second area is the bottom area of the at least one rear light.

In one embodiment, the first area is a first side area of the at least one rear light and the second area is a second side area of the at least one light.

In one embodiment, the first side area is a left side of the at least one rear light and wherein the second side area is a right side of the at least one light.

In one embodiment, the at least one light includes a first area, a second area and a third area. In one embodiment, a first portion of the plurality of light elements are arranged in the first area, a second portion of the plurality of light elements are arranged in the second area, and a third portion of the plurality of light elements are arranged in the third area. In one embodiment, the controller is configured to cause the first portion of the plurality of light elements in the first area to emit light before causing the of the plurality of light elements in the second area to emit light and configured to cause the second portion of the plurality of light elements in the second area to emit light before causing the third portion of the plurality of light elements in the third area to emit light, in the predetermined sequential order.

BRIEF DESCRIPTION OF THE SEVERAL VIEWS OF THE DRAWINGS

The foregoing summary, as well as the following detailed description of embodiments of the vehicle power system, will be better understood when read in conjunction with the appended drawings of an exemplary embodiment. It should be understood, however, that the invention is not limited to the precise arrangements and instrumentalities shown.

In the drawings.

DETAILED DESCRIPTION

There has been a dramatic increase in popularity of modular personal mobility vehicles over the last several decades. This increase is due to many factors including the advent of new structural techniques and materials, as well as a more active aging population that enjoys traveling. There is also an increased demand for additional components and features for safety, such as rear lights and rear brakes. Such mobility vehicles may be modular, where a rear assembly is detached from a front assembly to allow for more compact storage such as fitting in the trunk of a car. However, a problem arises when the lighting components are in the rear modular assembly and require electrical power from a power source located in the front modular assembly. When the power source for the vehicle is located in the front modular assembly of the vehicle, powering components in a rear modular assembly can require adding dedicated connections for each component, which can dramatically increase manufacturing costs. Requiring dedicated connections can also make connecting the front and rear modular assemblies more difficult because each of the dedicated connections can fail to mate correctly when the rear modular assembly is coupled to the front modular assembly. Thus it would be desirable to minimize the number of connections between the front and rear modular assemblies while maximizing the number of electrically-powered components in the rear modular assembly.

Referring to the drawings in detail, wherein like reference numerals indicate like elements throughout, there is shown in FIGS. 1-3D a vehicle 100 having a controller 120 for powering components in a rear modular assembly, generally designated 104, in accordance with an exemplary embodiment of the present invention.

Figure 1:
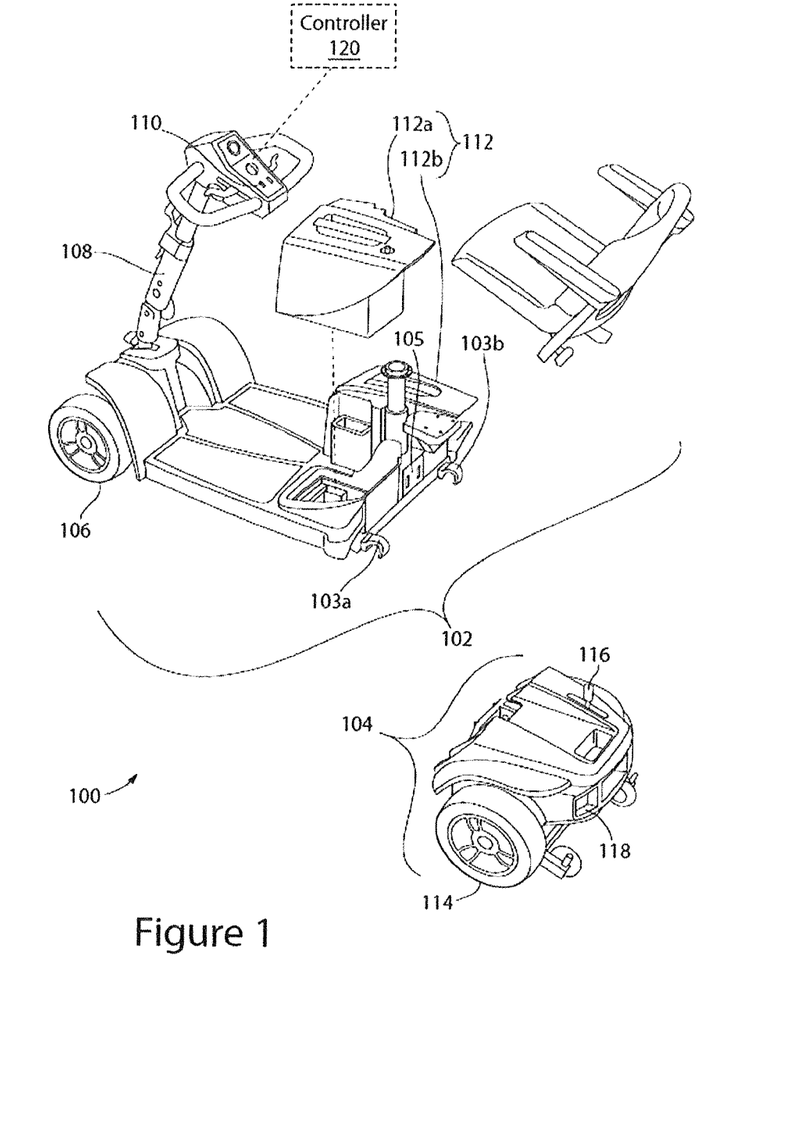
FIG. 1 is an exploded perspective view of a vehicle in accordance with an exemplary embodiment of the invention.

FIG. 1 illustrates a perspective view of a vehicle 100 in accordance with at least one embodiment of the invention.

In some embodiments, the vehicle 100 includes a front modular assembly 102 and a rear modular assembly 104. The front modular assembly 102 may be detachably couplable to the rear modular assembly 104. In one embodiment, hooks 103a, 103b from one assembly such as the front modular assembly 102 as shown engage with a feature such as a bar on the other assembly (not shown). The weight of the vehicle 100 may keep front and rear modular assemblies 102, 104 coupled until the front modular assembly 102 is lifted to detach the two components from one another. In other embodiments, one or more fasteners, latches or locks may be used to releasably couple the front modular assembly 102 to the rear modular assembly 104. Mating the pin connector 105 from the front modular assembly 102 with a corresponding pin connector (not shown) in the rear modular assembly 104 may also help to releasably couple the front and rear modular assemblies 102, 104 to one another such as through a socket connection. As a result, the vehicle 100 can be quickly and easily assembled and taken apart for storage or for being transported in another vehicle such as the trunk of a car.

The front modular assembly 102 may include at least one front wheel (e.g., front wheel 106). In FIG. 1, the front modular assembly 102 includes a second front wheel (not shown) laterally spaced from and parallel to the front wheel 106. The front modular assembly 102 may include a steering assembly 108 configured to steer the front wheel 106. In FIG. 1, the steering assembly 108 is a tiller that a user grasps with both hands and steers or turns the tiller along a generally vertical axis in the direction that the user wants the vehicle to turn.

The front modular assembly 102 may include a throttle 110. The throttle 110 is controllable by a user. In one embodiment, the throttle 110 is coupled to the steering assembly 108. The throttle may be a lever, switch or grip that the user actuates with his or her hand. While activated, the throttle 110 may be configured to drive one or more rear wheels of the vehicle 100. While released, the throttle 110 may be configured to refrain from driving the vehicle 100. In one embodiment, releasing the throttle 110 engages a brake on the one or more rear wheels 114 as described in further detail below. In one embodiment, a single throttle 110 is provided for controlling two rear wheels 114.

The front modular assembly 102 may include a power source 112. In some embodiments, the power source 112 includes one or more batteries, such as batteries 112a and 112b. In some embodiments, the power source 112 is removable. For example, in some embodiments, one or more fasteners, latches or locks are used to releasably couple the power source 112 (e.g., batteries 112a and 112b) to the front modular assembly 102. The power source 112 may be configured to generate a power signal to drive one or more wheels (e.g., front wheel 106 and/or rear wheel 114) of the vehicle 100 as well as power other components of the vehicle 100.

The rear modular assembly 104 may include at least one rear wheel (e.g., rear wheel 114). In FIG. 1, the rear modular assembly 104 includes a second rear wheel (not shown) laterally spaced from and parallel to rear wheel 114. In response to activation of the throttle 110, the rear wheels may be configured to drive the vehicle 100 (via one or more motors) in either forward or backward directions.

The rear modular assembly 104 may include a brake 116 that may be configured to operate in an engage state and a disengage state. In the engage state, the brake 116 may be configured to hold the vehicle 100 in a braking static state by engaging the rear wheel 114. In the disengage state, the brake 116 may be configured to refrain from holding the vehicle 100 in a braking static state by disengaging from the rear wheel 114. In some embodiments, the brake 116 is configured to operate in the engage state while receiving a power signal and operate in a disengage state while not receiving a power signal (or vice versa in alternative embodiments). In some embodiments, the brake 116 includes a solenoid. In some embodiments, the solenoid may cause the brake 116 to restrict motion of the rear wheel 114 in the engaged state while not receiving the power signal and cause the brake 116 to disengage from the rear wheel 114 while receiving the power signal. In some embodiments, the brake 116 may include an actuator (e.g., a lever) that is used to manually mechanically engage or disengage a drive motor connected to the rear wheel 114 to drive the rear wheel 114 to allow a person to push the vehicle 100 without resistance of the motor. In some embodiments, when the throttle is released, resistance from the drive motor connected to the rear wheel 114 causes the rear wheel 114 to slow, thereby causing the vehicle 100 to come to a stop. In some embodiments, when the throttle is released, the drive motor is also configured to recharge the power source 112.

The rear modular assembly 104 may include at least one rear light 118 that may be configured to emit light in certain circumstances. In some embodiments, the rear light 118 is configured to emit light in response to receiving a power signal.

In some embodiments, the brake 116 and the rear light 118 are configured to be in electrical communication with the power source 112 while the rear modular assembly 104 is coupled to the front modular assembly 102. In some embodiments, the brake 116 and the rear light 118 are in electrical communication with the power source 112 via a single shared connection. In some embodiments, the single shared connection is connector 105 in the front modular assembly 102 that mates with a corresponding connector (not shown) in the rear modular assembly 104. In some embodiments, the connector 105 is a 4-pin connector. However, it is contemplated that other embodiments may utilize a different number of pins in the connector 105. In some embodiments, the number of pins may be fewer than 4. Using a single shared connection, depending on when the power signal is selectively received, the brake 116 may be configured to operate in its engage and disengage states while the rear light 118 is configured to emit light. By using a single shared connection, costs for electrical connections between some of the electrical components in the rear assembly 104 can be reduced by eliminating the need to include a dedicated connection for each electrical component. Also, fewer connections may reduce the likelihood of poor engagement when the connector from the front assembly 102 is mated with the connector from the rear assembly 104.

In some embodiments, the vehicle 100 includes a controller 120 in electrical communication with the power source 112. The controller 120 may be configured to selectively provide a power signal from the power source 112 to the brake 116 and the at least one rear light 118 via the single shared connection in certain circumstances. For example, in some embodiments, while the throttle is activated, the controller 120 causes the brake 116 to receive the power signal, and thereby causes the brake 116 to disengage from the rear wheel 114 in the disengage state so that the user can drive the vehicle 100. In some embodiments, while the throttle 110 is released, the controller 120 prevents the brake 116 from receiving the power signal, and thereby causes the brake 116 to engage (or restrict motion of) the rear wheel 114 in the engage state to hold the vehicle 100 in a braking static state. In some embodiments, while the throttle is activated, the controller 120 causes the rear light 118 to receive the power signal. In some embodiments, the rear light 118 operates as running lights that emit light while the vehicle 100 is being driven. In some embodiments, while the throttle is released, the controller 120 prevents the rear light 118 from receiving the power signal thereby causing the rear light 118 to refrain from emitting light. Using such a configuration, the vehicle 100 may operate the brake 116 and the rear light 118 using a single connection, thereby minimizing the total number of electrical connections between electrical components in the rear modular assembly 104 and the power source 112 in the front modular assembly 102.

Exemplary Power Configuration

Figure 2A:
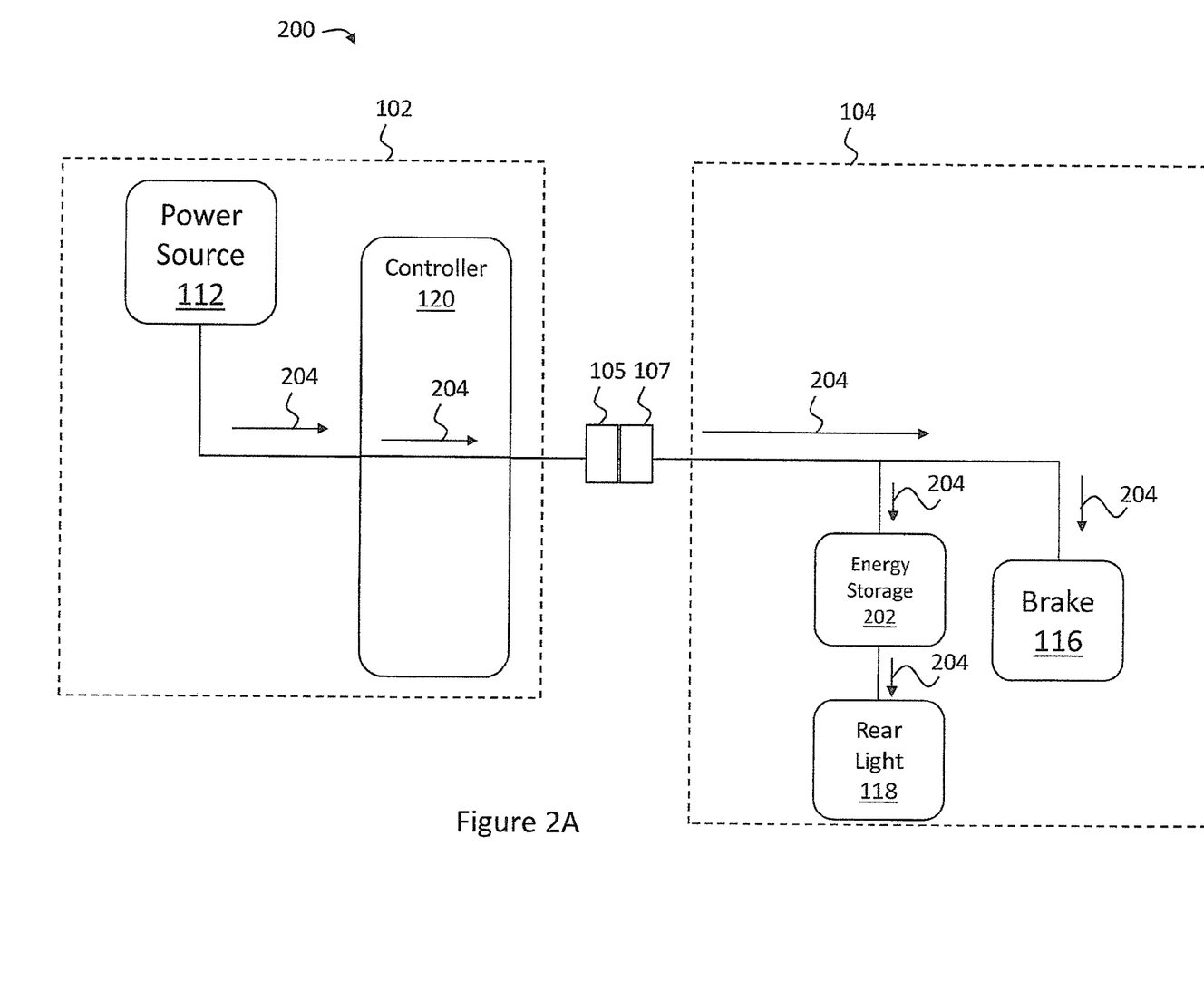
FIGS. 2A-2C are a schematic diagrams of an exemplary configuration for operating a brake and a rear light of a vehicle such as the vehicle shown in FIG. 1.
Figure 2B:
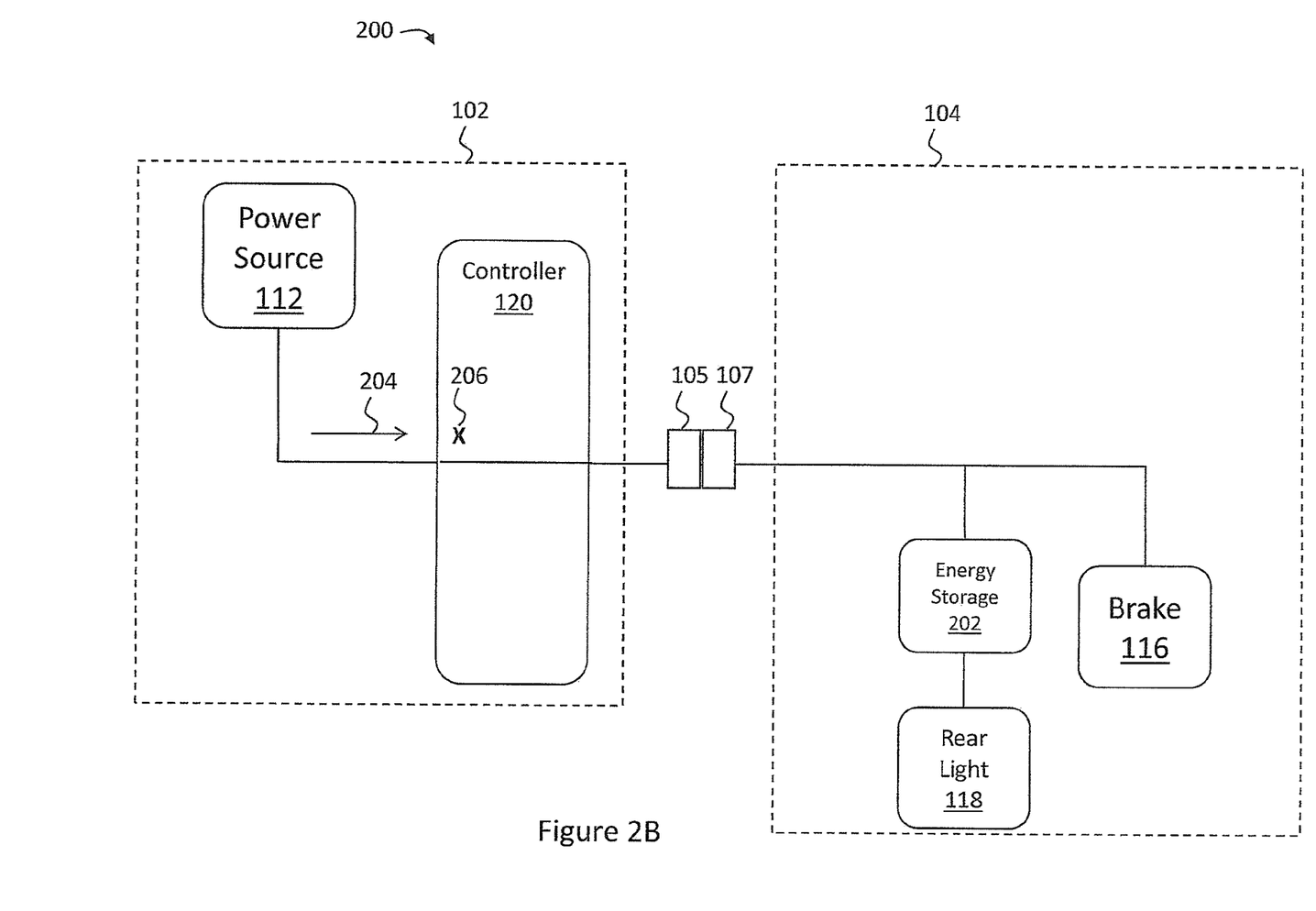
Figure 2C:
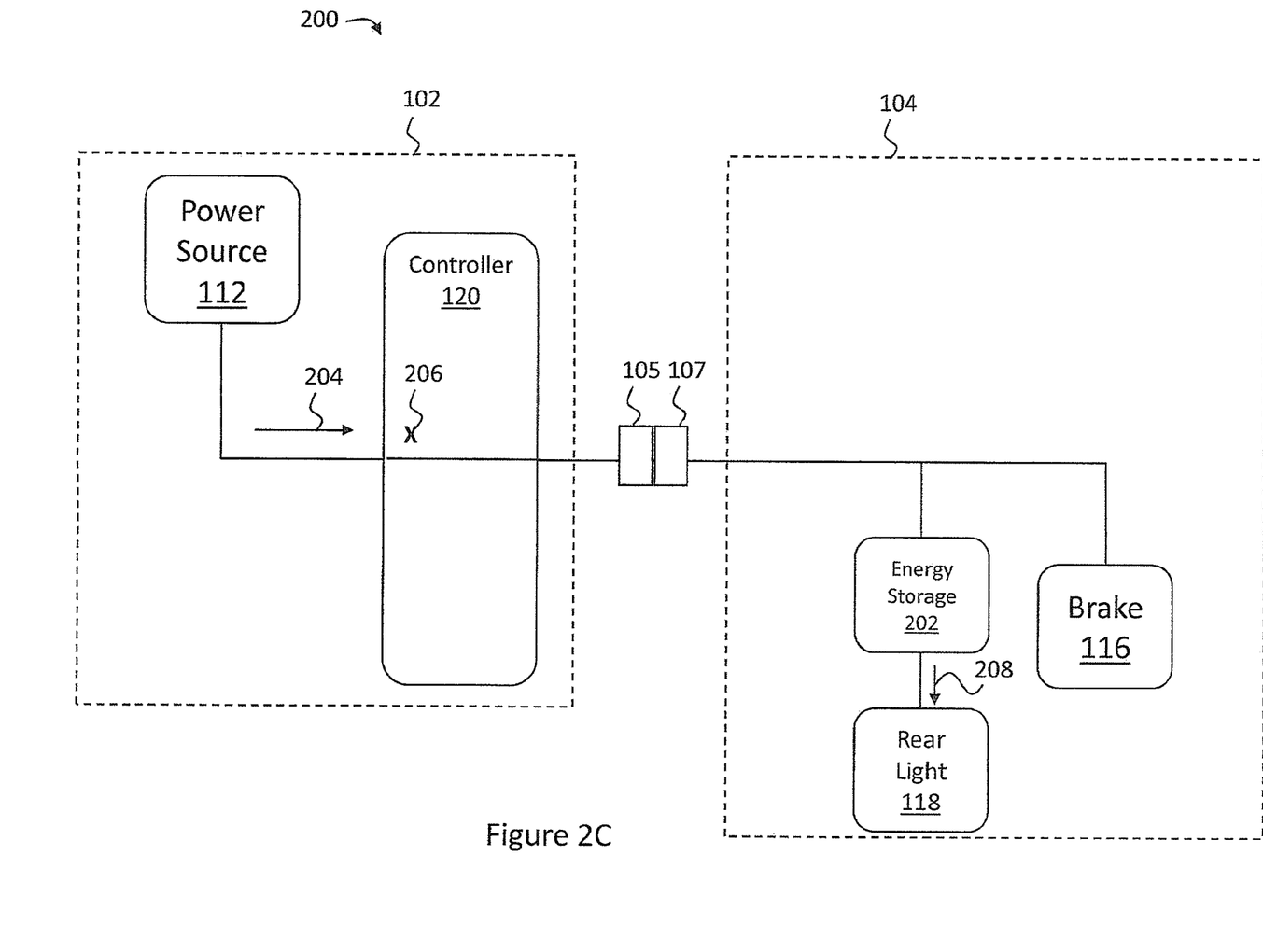

FIGS. 2A-2C illustrate a schematic representation of an exemplary lighting assembly 200 configuration for operating the brake 116 and the rear light 118, using the controller 120 and power source 112 of a vehicle such as the vehicle shown in FIG. 1.

The lighting assembly 200 includes the power source 112 and the controller 120 positioned in the front modular assembly 102. The lighting assembly 200 also includes the brake 116 and the rear light 118 positioned, in parallel, in the rear modular assembly 104. The lighting assembly 200 may also include the connector 105 associated with the front modular assembly 102 that, when coupled with another connector 107 associated with the rear modular assembly 104, allows the brake 116 and the rear light 118 to be in electrical communication with the controller 120 and power source 112.

In FIG. 2A, while not shown, the throttle 110 of the vehicle 100 is in an activated state because the user desires to drive the vehicle 100. While the throttle 110 is in the activated state, the power source 112 provides a power signal (represented as arrows 204 and referred to herein as power signal 204) to the controller 120. Because the throttle 110 is in the activated state, the controller 120 may provide the power signal 204 to the brake 116 and the rear light 118. By providing the power signal 204 to the brake 116, the controller 120 may cause the brake 116 to operate in the disengage state. As a result, the brake 116 may disengage from the rear wheel 114 so that the user can drive the vehicle 100. By providing the power signal 204 to the rear light 118, the controller 120 may cause the rear light 118 to emit light.

In some embodiments, while the controller 120 provides the power signal 204 to the brake 116 and rear light 118, the controller 120 stores residual energy from the power signal in energy storage 202, that is not used by the brake 116 or the rear light 118, while the throttle is in the activated state. The residual energy can be used to provide power to the electrical components in the rear modular assembly 104, such as the rear light 118 in certain circumstances, and as described below in more detail. In some embodiments, the energy storage 202 includes one or more capacitors, super capacitors, chargeable batteries and inductors. In some embodiments, these additional energy storage components may also be appropriate.

In FIG. 2B, while not shown, the throttle 110 of the vehicle 100 is in a released state because the user desires to stop the vehicle 100. While the throttle 110 is in the released state, the power source 112 may provide a power signal 204 to the controller 120. However, because the throttle 110 is in the released state, the controller 120 prevents the brake 116 and the rear light 118 from receiving the power signal (represented as "X" 206 in FIG. 2B). By preventing the brake 116 from receiving the power signal 204, the controller 120 causes the brake 116 to operate in the engaged state. As a result, the brake 116 engages (or restricts motion of) the rear wheel 114 so that the user can stop and park the vehicle 100. By preventing the rear light 118 from receiving the power signal 204, the controller 120 prevents the rear light 118 from emitting light based on the power signal 204.

In some embodiments, such as the embodiment shown in FIG. 2C, while the throttle is in the released state, the controller 120 provides residual energy (represented as arrows 208 and referred to herein as residual energy 208) from the energy storage 202 to the rear light 118. By providing the residual energy 208 to the rear light 118, the controller 120 causes the rear light 118 to emit light using the residual energy for a residual energy light emission time period after the throttle transitions from the activated state to the released state. In some embodiments, the residual energy light emission time period is less than 1 minute; less than 50 seconds; less than 40 seconds; less than 30 seconds; less than 20 seconds; less than 10 seconds; less than 5 seconds; or less than 1 second. In some embodiments, the residual energy light emission time period is greater than 1 second; greater than 5 seconds; greater than 10 seconds; greater than 20 seconds; greater than 30 seconds; greater than 40 seconds; greater than 50 seconds; or greater than 1 minute. In some embodiments, the residual energy light emission time period is from 5 to 30 seconds; from 15 to 25 seconds; or approximately 20 seconds. In some embodiments, the residual energy light emission time period depends on an amount of time that the throttle is in the activated state before it transitions to the released state. By causing the rear light 118 to emit light after the throttle transitions to the released state, the vehicle 100 may be safer by providing a noticeable visual indicator to motorists or pedestrians that are approaching the vehicle from behind. Also, by causing the rear light 118 to emit light after the throttle transitions to the released state, the vehicle 100 may reduce the amount of toggling between an on and off state for the rear light 118 associated with activate and release states of the throttle. Because on/off toggling of the lights may lead to degradation of light sources, by minimizing toggling of the rear light 118, rear light 118 degradation is minimized and life expectancy for the rear light 118 may be improved.

Exemplary Light Configuration

Figure 3A:
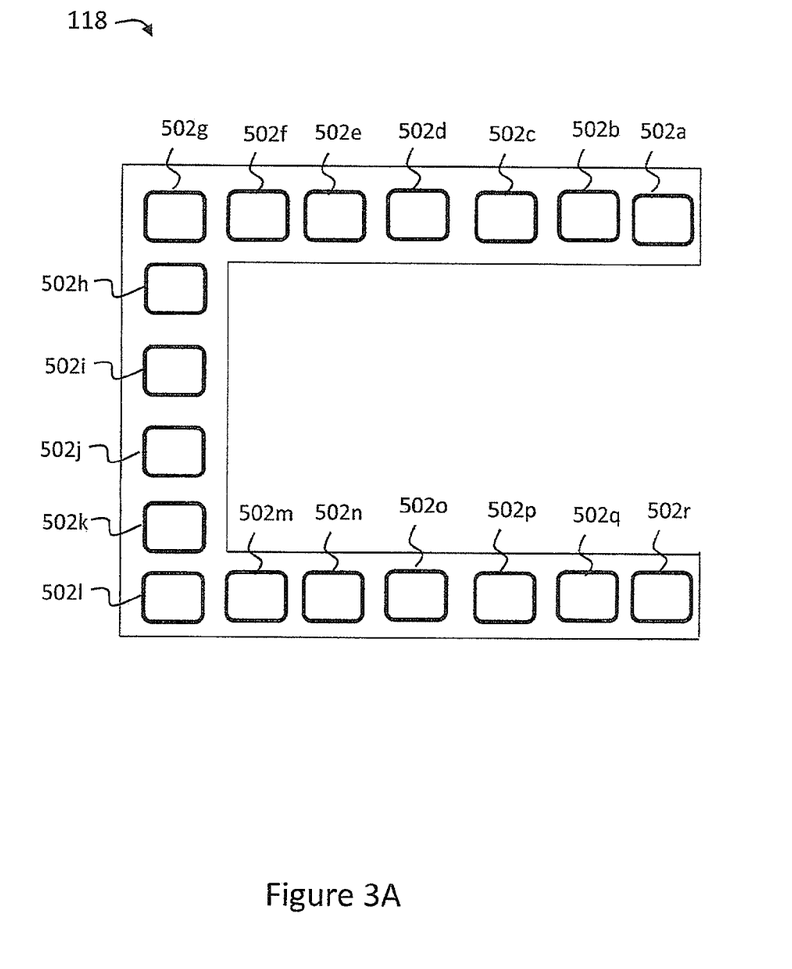
FIG. 3A is a schematic diagram of a rear light for use with a vehicle such as the vehicle shown in FIG. 1.

FIG. 3A illustrates an exemplary configuration of rear light 118 according to at least some embodiments of the invention.

In some embodiments, rear light 118 is configured to draw a current from the power signal that is less than an electrical current power threshold (e.g., 20 mA). By drawing a current that falls below the electrical current power threshold, the rear light 118 can be utilized by the vehicle 100 without interfering with the operation of the brake 116, which also draws current from the same power signal. In some embodiments, rear light 118 may include one or more light elements, such as light elements 502a-r as shown in FIG. 3A, that draw an amount of current that falls below the electrical current power threshold. The light elements 502a-r may be light emitting diodes, but in other embodiments, other types of light elements may be used. In the embodiment, each rear light (such as rear light 118) includes approximately 18 light emitting diodes and operates at approximately 0.25 watts or less. However, it is contemplated that different numbers of light emitting diodes or elements may be used, provided that the total current draw by the rear light 118 does not exceed the electrical current power threshold.

In some embodiments, rear light 118 is configured in, but not limited to, a U-shape, as shown in FIG. 3A. However, different configurations are used in other embodiments, including an array, circular, square, triangle, or any other shape that allows the rear light 118 to emit light that is visible to a motorist or pedestrian located behind the vehicle 100 or otherwise provides the desired lighting effect.

In some embodiments, the electrical current power threshold is between 1 mA and 50 mA; between 2 mA and 45 mA; between 3 mA and 40 mA; between 4 mA and 35 mA; between 5 mA and 30 mA; between 10 mA and 25 mA; between 15 mA and 25 mA; or approximately 20 mA. In some embodiments, the electrical current power threshold is less than 30 mA; less than 25 mA; less than 20 mA; less than 15 mA; less than 10 mA; less than 5 mA; less than 4 mA; less than 3 mA; less than 2 mA; or less than 1 mA.

In some embodiments, the total watts of the rear lights (e.g., including rear light 118) is less than 10 W; less than 9.5 W; less than 9.0 W; less than 8.5 W; less than 8.0 W; less than 7.5 W; less than 7.0 W; less than 6.5 W; less than 6.0 W; less than 5.5 W; less than 5.0 W; less than 4.5 W; less than 4.0 W; less than 3.5 W; less than 3.0 W; less than 2.5 W; less than 2.0 W; less than 1.5 W; less than 1.0 W; less than 0.5 W; less than 0.4 W; less than 0.3 W; less than 0.2 W; or less than 0.1 W.

In some embodiments, one or more of the rear lights satisfy a standard for e-mark lighting for U.S. and/or European use. The e-mark standards provided in "Agreement Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions" dated Sep. 20, 2010 are incorporated by reference in their entirety herein.

Figure 3B:
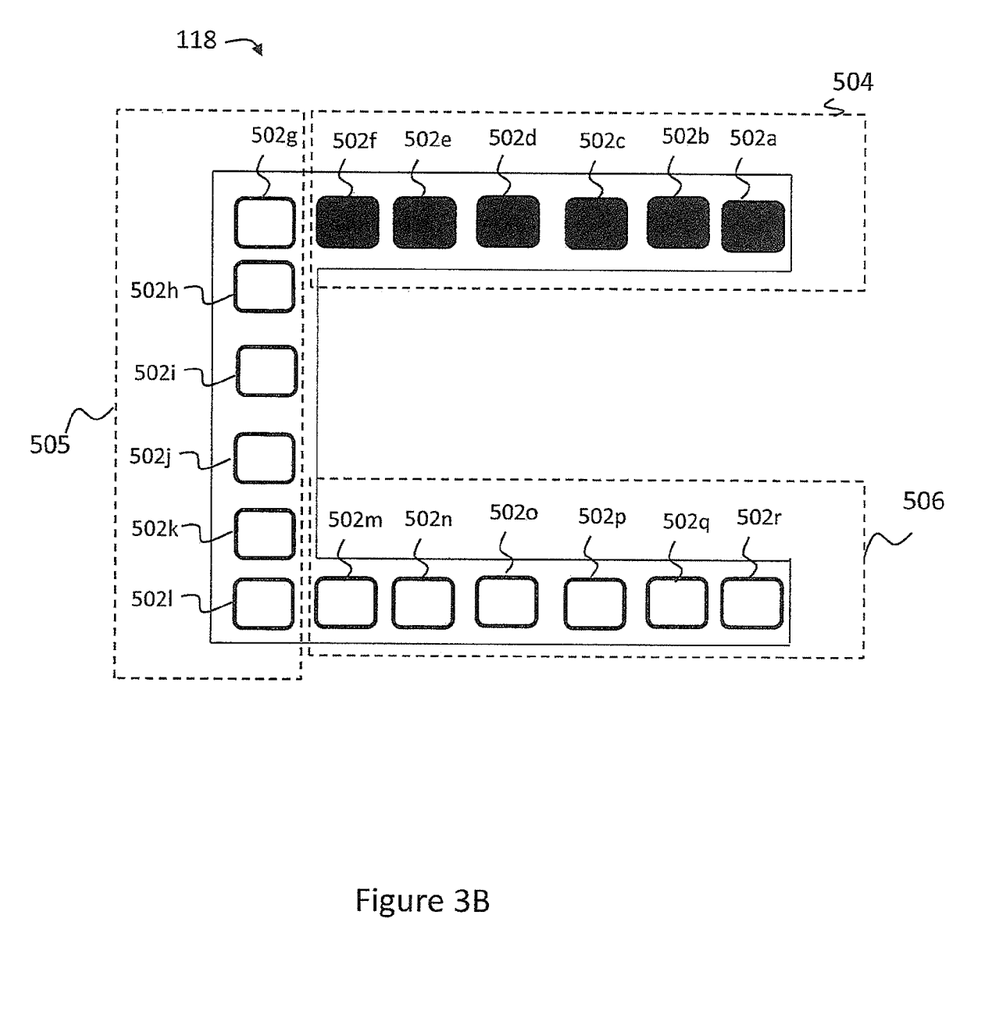
FIGS. 3B-3D are additional schematic diagrams of the rear light as shown in FIG. 3A.
Figure 3C:
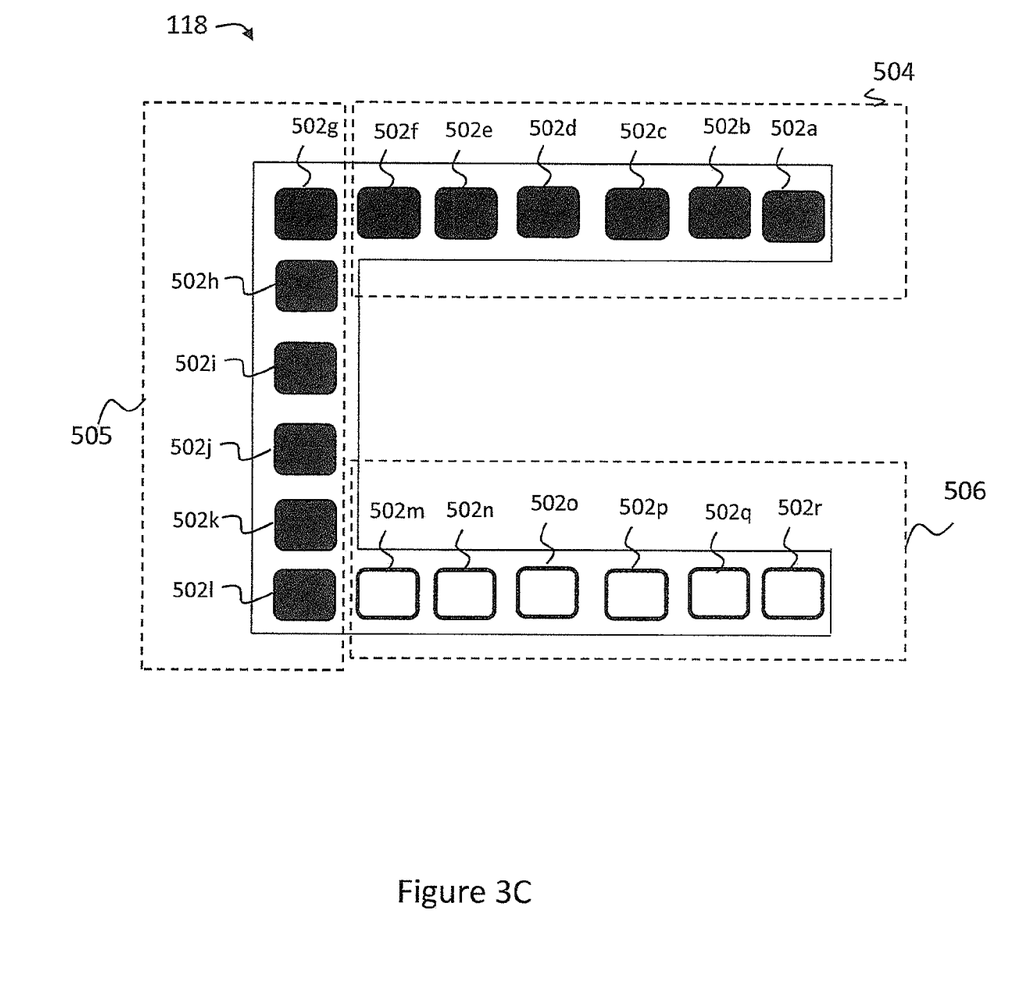
Figure 3D:
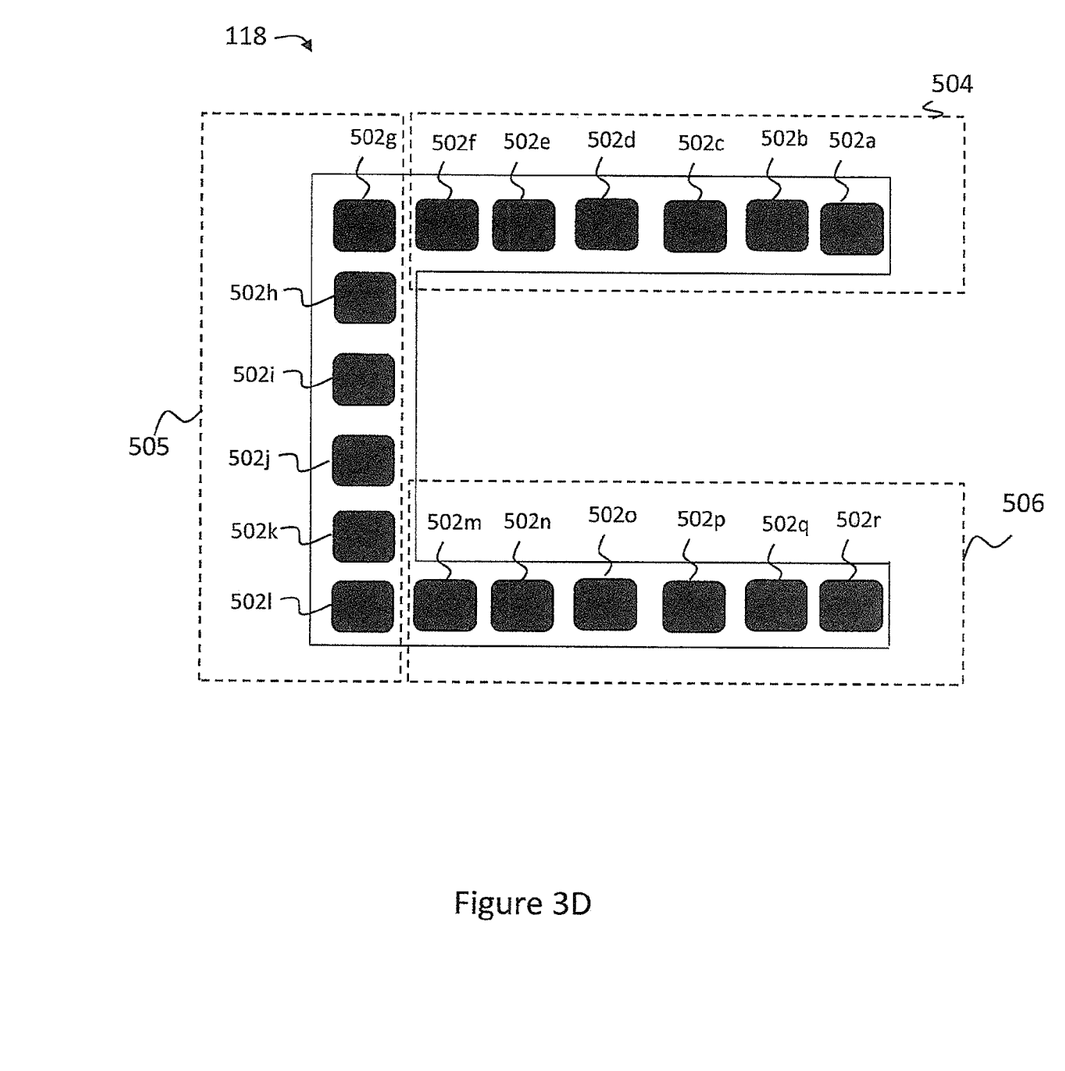

FIGS. 3B-3D illustrate an exemplary operation of rear light 118 as shown in FIG. 3A according to at least some embodiments of the invention.

In some embodiments, each of the light elements 502a-r is configured to emit light in a predetermined sequential order. In FIGS. 3B-3D, light elements 502a-r are shown as outlined boxes when the light elements do not emit light and are shown as solid boxes when the light elements emit light. In some embodiments, each of the light elements 502a-r are divided into one or more groups, by area. The controller 120 may be configured to cause a first portion of light elements in the first area to emit light before causing a second portion of the plurality of light elements in the second area to emit light in the predetermined sequential order. In some embodiments, the controller 120 includes first, second, and third portions of light elements. In some embodiments, the controller 120 may be configured to cause the first portion of light elements to emit light before the second portion of light elements and configured to cause the second portion of light elements to emit light before the third portion of light elements. For example, FIG. 3B shows a state of operation of the rear light 118 at a time $t_1$; FIG. 3C shows a state of operation of the rear light 118 at a time $t_2$; and FIG. 3D shows a state of operation of the rear light 118 at a time $t_3$, where time $t_2$ occurs after time $t_1$ and time $t_3$ occurs after time $t_2$. In this embodiment, the rear light 118 includes a first area 504 a second area 505 and a third area 506. Light elements 502a-502f are arranged in the first area 504, light elements 502g-502l are arranged in the second area 505, and light elements 502m-502r are arranged in the third area 506. In response to a power signal 204 received from the controller 120, light elements 502a-502f in the first area 504 initially emit light, as shown in FIG. 3B, then light elements 502g-502l in the second area 505 emit light, as shown in FIG. 3C, and finally light elements 502m-502r in the third area 506 emit light, as shown in FIG. 3D. In some embodiments, the light elements are configured to emit light in a sequential order by connecting each group of light elements in an area in series with an RC filter. Each RC filter may include resistors and capacitors having different characteristics as compared to other RC filters. By utilizing RC filters with different characteristics, the RC filters may cause the corresponding group of light elements to emit light at different times (e.g., few hundred milliseconds apart). In some embodiments, the rear light 118 includes two areas, where light elements 502a-502r may be arranged in a first area and second area. In some embodiments, light elements 502a-502i in a top area correspond to a first area 504 and light elements 502j-502r in a bottom area correspond to a second area 504. However, it is contemplated that other areas of the rear light 118 may be used for grouping the light elements 502a-502r, such as a left and right sides of the rear light 118, among others. By sequentially causing light elements to emit light, the vehicle 100 can utilize light elements that emit less light while still drawing attention from motorists and pedestrians positioned behind the vehicle 100.

Alternative Embodiments

While many of the embodiments herein discuss the brake 116 and rear light 118 as the components in the rear modular assembly 104 that share a single connection, it is also contemplated that, in other embodiments, different or additional electrical components may share a single connection with the power source 112 (e.g., the brake, rear lights, vehicle backup sensors (e.g., haptic, auditory), rear vehicle cameras, spot light, USB charging port, etc.).

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. The words "right", "left", "lower" and "upper" designate directions in the drawings to which reference is made. The words "inwardly" and "outwardly" refer to directions toward and away from, respectively, the geometric center of the vehicle 100 or any of its components. Unless specifically set forth herein, the terms "a", "an" and "the" are not limited to one element but instead should be read as meaning "at least one". As used herein, the term "about" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A vehicle comprising:
    a front modular assembly including:
        at least one front wheel,
        a steering assembly to steer the at least one front wheel,
        a throttle to drive the vehicle, and
        a power source configured to generate a power signal;
    a rear modular assembly removably couplable to the front modular assembly, the rear modular assembly including:
        at least one rear wheel,
        a brake selectively coupled to the at least one rear wheel, and
        at least one rear light configured to emit light while receiving the power signal, the at least one rear light and the brake being in electrical communication with the power source via a shared electrical connection while the rear modular assembly is coupled to the front modular assembly; and
    a controller in electrical communication with the power source, the controller being configured to selectively provide the power signal to the brake and the rear light via the shared electrical connection,
    wherein the controller includes a storage device that stores residual energy from the power signal while the throttle is activated and wherein the controller causes the at least one rear light to receive the residual energy from the power signal for a residual energy light emission time period after the throttle is released.

2. The vehicle of claim 1, wherein the controller is configured to:
    cause the brake and the at least one rear light to receive the power signal while the throttle is activated, which causes the brake to disengage from the at least one rear wheel and causes the at least one rear light to emit light, and
    prevent the brake and the at least one rear light from receiving the power signal while the throttle is released, which causes the brake to engage the at least one rear wheel and causes the at least one rear light to refrain from emitting light using the power signal after the residual energy light emission time period.

3. The vehicle of claim 1, wherein the brake includes a solenoid that causes the brake to restrict motion of the at least one rear wheel in the engage state while not receiving the power signal and causes the brake to disengage from the at least one rear wheel while receiving the power signal.

4. The vehicle of claim 1, wherein the storage device includes one or more capacitors.

5. The vehicle of claim 1, wherein the residual energy light emission time period is from 5 to 30 seconds.

6. The vehicle of claim 1, wherein the at least one rear light draws a current from the power signal and wherein the current from the power signal is less than an electrical current power threshold.

7. The vehicle of claim 1, wherein the at least one rear light includes a plurality of light elements and wherein each of the plurality of light elements emit light in a predetermined sequential order.

8. The vehicle of claim 7, wherein the at least one light includes a first area and a second area, wherein a first portion of the plurality of light elements are arranged in the first area and a second portion of the plurality of light elements are arranged in the second area and wherein the controller is configured to cause the first portion of the plurality of light elements in the first area to emit light before causing the second of the plurality of light elements in the second area to emit light in the predetermined sequential order.

9. The vehicle of claim 8, wherein the first area is a top area of the at least one rear light and the second area is the bottom area of the at least one rear light.

10. The vehicle of claim 8, wherein the first area is a first side area of the at least one rear light and the second area is a second side area of the at least one light.

11. The vehicle of claim 10, wherein the first side area is a left side of the at least one rear light and wherein the second side area is a right side of the at least one light.

12. The vehicle of claim 7, wherein the at least one light includes a first area, a second area and a third area,
    wherein a first portion of the plurality of light elements are arranged in the first area, a second portion of the plurality of light elements are arranged in the second area, and a third portion of the plurality of light elements are arranged in the third area, and
    wherein the controller is configured to cause the first portion of the plurality of light elements in the first area to emit light before causing the of the plurality of light elements in the second area to emit light and configured to cause the second portion of the plurality of light elements in the second area to emit light before causing the third portion of the plurality of light elements in the third area to emit light, in the predetermined sequential order.

13. The vehicle of claim 1, wherein the at least one rear light is electrically disconnected from the power source when the rear modular assembly is decoupled from the front modular assembly.

* * * * *